US009131460B2

(12) United States Patent
Hans et al.

(10) Patent No.: US 9,131,460 B2
(45) Date of Patent: Sep. 8, 2015

(54) RADIO RELAY COMMUNICATION DEVICE, METHOD FOR RELAYING DATA, MOBILE TERMINAL, AND METHOD FOR DETERMINING A SENDER OF A SIGNAL

(75) Inventors: Martin Hans, Bad Salzdetfurth (DE); Hyung-Nam Choi, Hamburg (DE); Maik Bienas, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1242 days.

(21) Appl. No.: 13/027,403

(22) Filed: Feb. 15, 2011

(65) Prior Publication Data

US 2012/0208523 A1 Aug. 16, 2012

(51) Int. Cl.
*H04B 7/185* (2006.01)
*H04W 64/00* (2009.01)
(Continued)

(52) U.S. Cl.
CPC ............ *H04W 64/00* (2013.01); *H04W 76/021* (2013.01); *H04W 84/047* (2013.01)

(58) Field of Classification Search
CPC ... H04W 84/047; H04W 88/04; H04W 16/26; H04W 40/02; H04W 36/30; H04W 40/22; H04W 40/30; H04W 84/18; H04W 40/32; H04W 52/46; H04W 76/02; H04W 80/00; H04B 7/15; H04B 7/15592; H04B 7/15507; H04B 7/15557; H04B 10/272; H04B 3/36; H04B 3/58; H04B 7/02; H04B 7/2606; H04L 45/28; H04L 45/22; H04L 12/12; H04L 45/00; H04L 45/12; H04L 45/125; H04L 45/26; H04L 12/40; H04L 45/70; H04L 47/10; H04L 47/11; H04L 49/40; H04L 12/4625

USPC .................. 455/7, 13.1, 445, 9, 24, 424, 450; 370/315, 401, 235, 279, 392, 400, 221, 370/218, 227, 338, 395.31; 375/211
See application file for complete search history.

(56) References Cited

U.S. PATENT DOCUMENTS 7,194,275 B2   3/2007   Bolin et al.
7,826,343 B2   11/2010  Krasner
(Continued)

FOREIGN PATENT DOCUMENTS

WO   2006029276 A1   3/2006
WO   2010090776 A1   8/2010

OTHER PUBLICATIONS

3GPP TS 36.211 V9.1.0 3rd Generation Partnership Project; Technical Specification Group Radio Access Network; Evolved Universal Terrestrial Radio Access (E-UTRA); Physical Channels and Modulation (Release 9); Mar. 2010, pp. 1-85.

*Primary Examiner* — Fred Casca
(74) *Attorney, Agent, or Firm* — Schwabe, Williamson & Wyatt, P.C.

(57) ABSTRACT

According to an embodiment, a radio relay communication device is described a radio receiver configured to receive data from a radio base station, a radio sender configured to send data received from the radio base station to at least one mobile terminal, a detector configured to detect whether a pre-determined transmission symbol sequence has been received from the radio base station, a changing circuit configured to change the transmission symbol sequence such that from the change of the transmission symbol sequence an identification of the relay communication device can be determined, and a controller configured to control the radio sender configured to send the changed transmission symbol sequence to at least one mobile terminal.

13 Claims, 12 Drawing Sheets

(51) Int. Cl.
*H04W 76/02* (2009.01)
*H04W 84/04* (2009.01)

(56) References Cited

U.S. PATENT DOCUMENTS

| | | |
|---|---|---|
| 2003/0008664 A1 | 1/2003 | Stein et al. |
| 2005/0254592 A1* | 11/2005 | Naguib et al. ................. 375/267 |
| 2006/0056456 A1* | 3/2006 | Ratiu et al. .................... 370/474 |
| 2009/0061899 A1* | 3/2009 | Hwang et al. .............. 455/456.2 |
| 2010/0081451 A1 | 4/2010 | Mueck et al. |
| 2010/0215009 A1* | 8/2010 | Yu et al. ........................ 370/329 |
| 2010/0278047 A1* | 11/2010 | Koorapaty et al. ........... 370/241 |
| 2011/0150103 A1* | 6/2011 | Choi et al. ............... 375/240.27 |

\* cited by examiner

FIG 11
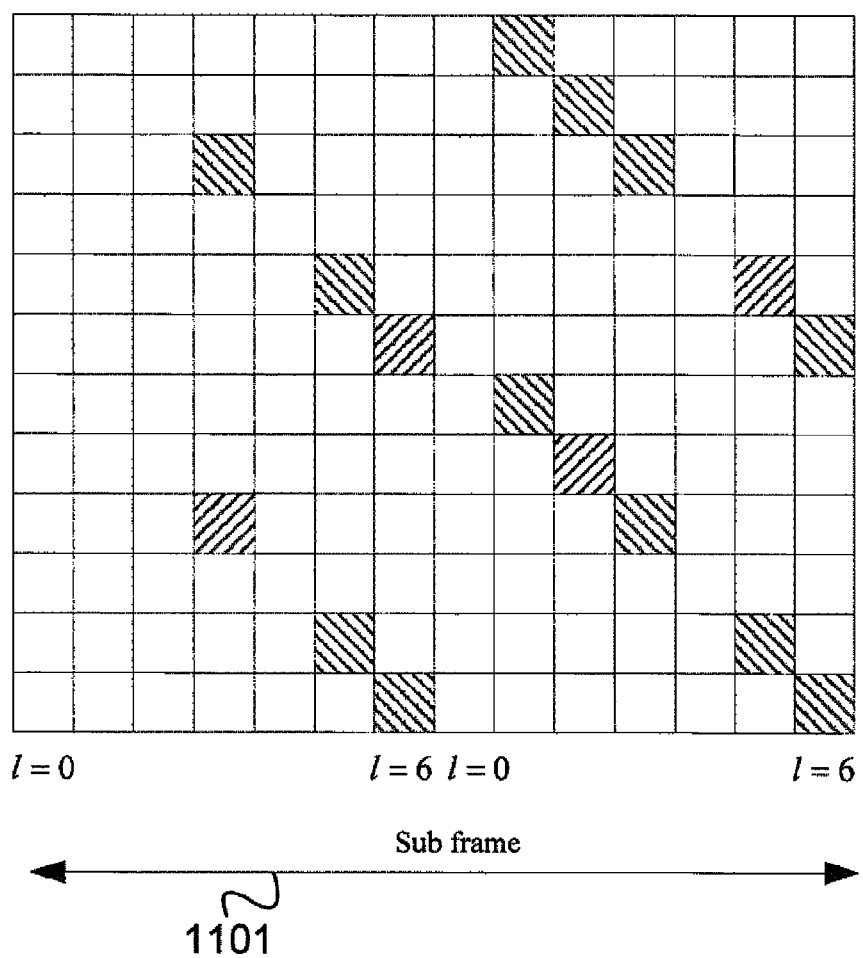
$l=0$  $l=6$ $l=0$  $l=6$
Sub frame
1101
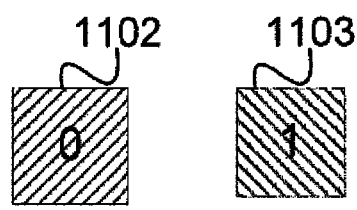
1102  1103

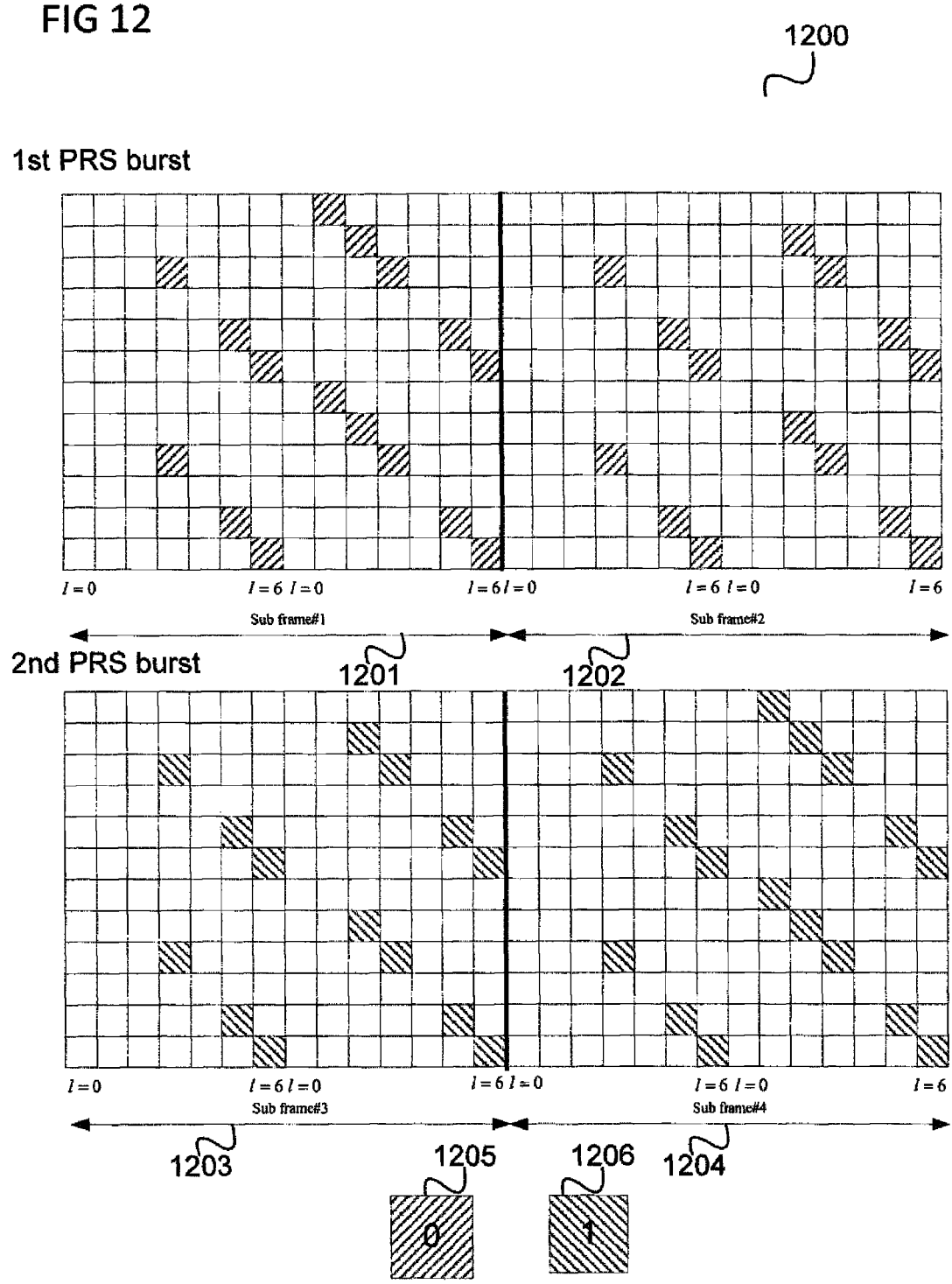

RADIO RELAY COMMUNICATION DEVICE, METHOD FOR RELAYING DATA, MOBILE TERMINAL, AND METHOD FOR DETERMINING A SENDER OF A SIGNAL

TECHNICAL FIELD

Embodiments generally relate to a radio relay communication device, a method for relaying data, a mobile terminal, and a method for determining a sender of a signal.

BACKGROUND

In cellular communication systems a mobile terminal may estimate its geographical position using various methods. However, such methods may have low accuracy, in particular when a mobile terminal is in a building. Since the number of applications based on position estimation are increasing, e.g. navigation applications, methods and systems are desirable that allow the determination of a mobile terminal with high accuracy.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 11 shows a resource allocation diagram.

FIG. 12 shows a resource allocation diagram.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
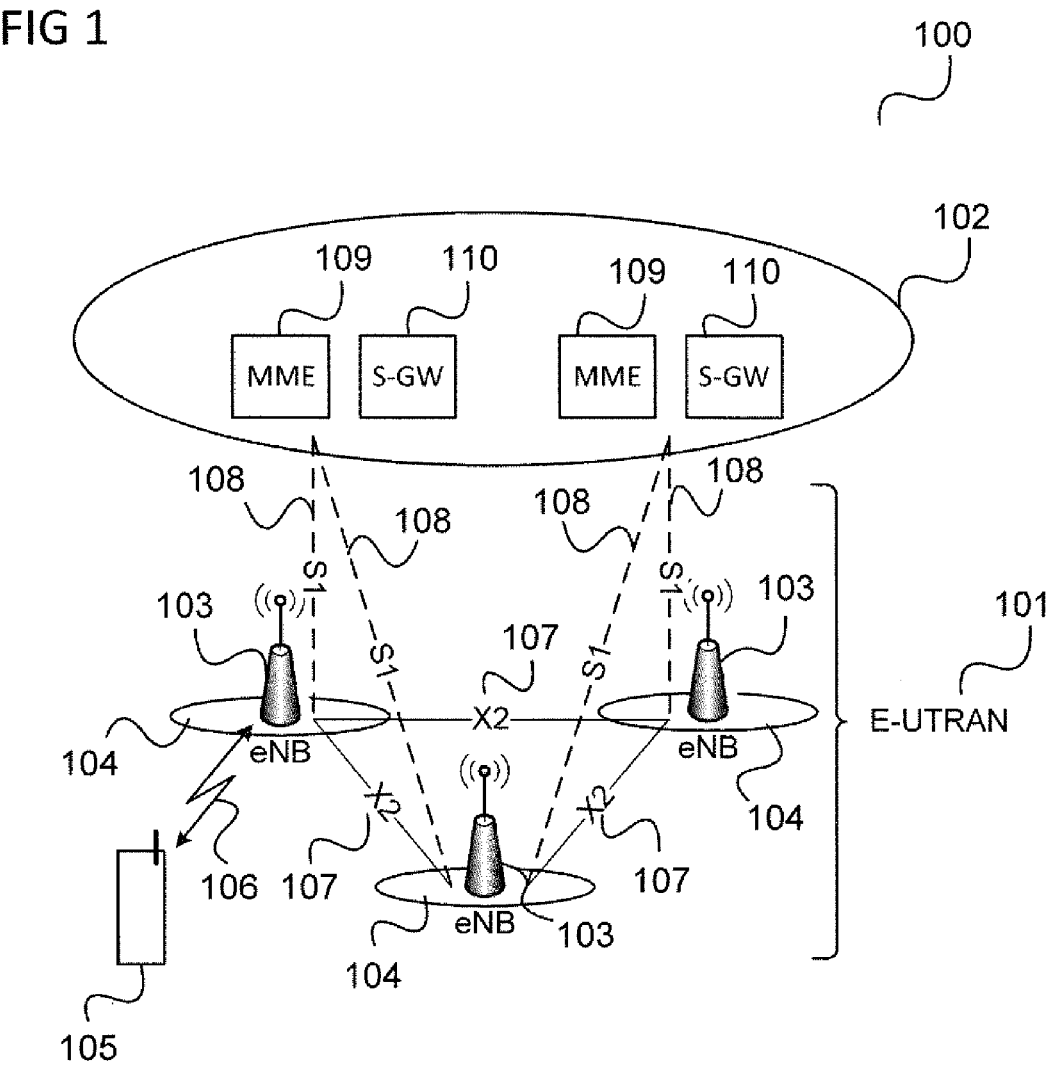
FIG. 1 shows a communication system according to an embodiment.

FIG. 1 shows a communication system 100 according to an embodiment.

According to this embodiment, the communication system 100 is configured in accordance with the network architecture of LTE. The communication system 100 may also be configured according to other communciation standards in other embodiments, e.g. according to UMTS (Univeral Mobile Telecommunications System).

The communication system 100 includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals 105 via the base station providing coverage (in other words operating) in the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to an MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

For LTE communication systems, the use of relay nodes is currently discussed in 3GPP for the Release 10 version of the communication standard in order to further evolve LTE in terms of coverage and cell-edge throughput.

Figure 2:
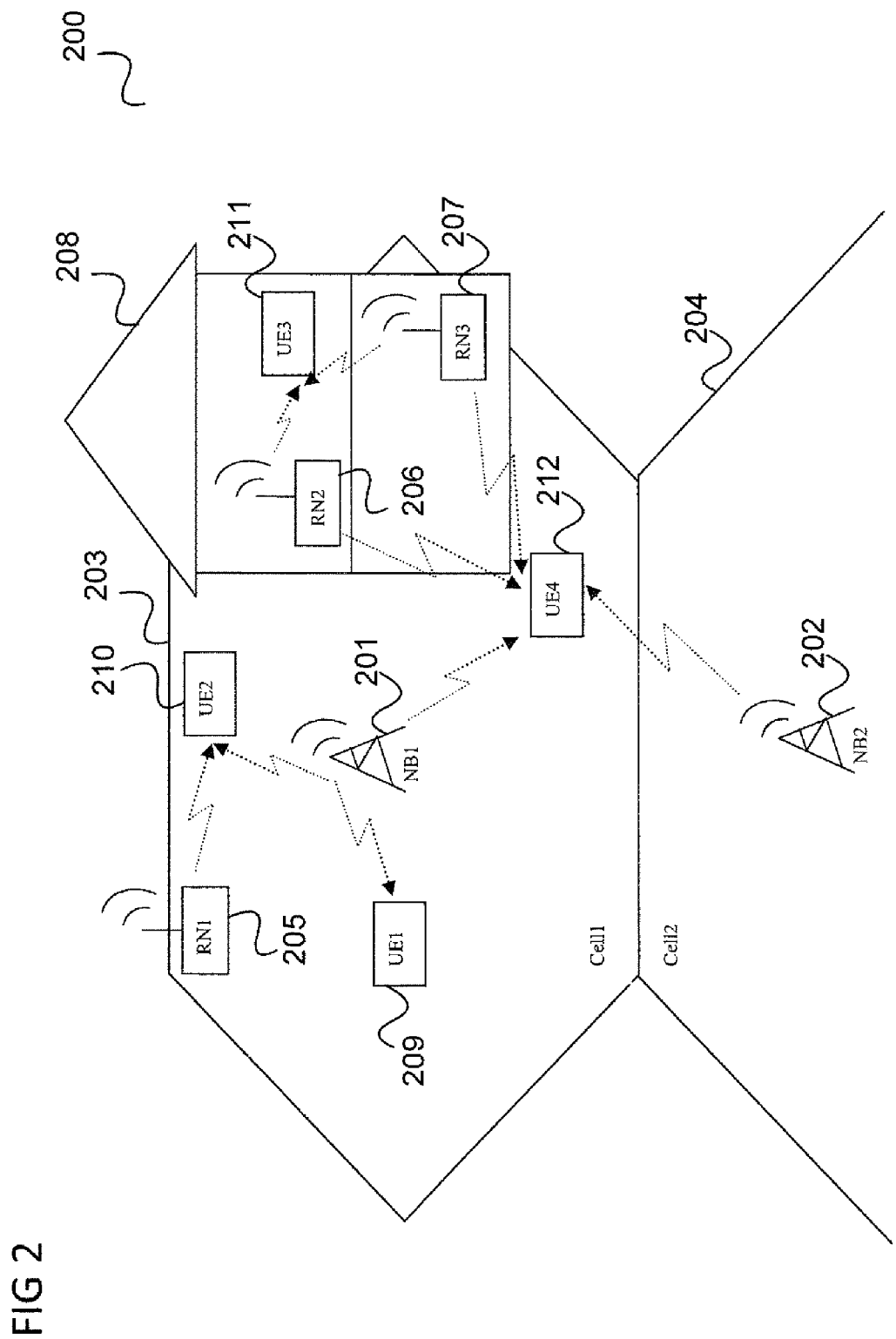
FIG. 2 shows a communication system according to an embodiment.

A communication system including relay nodes is illustrated in FIG. 2.

FIG. 2 shows a communication system 200 according to an embodiment.

The communication system 200 includes a first base station 201 and a second base station 202 for example corresponding to two of the base stations 103 of the communication system 100. The first base station 201 operates a first radio cell 203 and the second base station 202 operates a second radio cell 204. In this example, it is assumed that a building 208 is located in the first radio cell 203. The radio cells 203, 204 may also overlap in one or more areas.

The communication system 200 further includes a first relay node 205, a second relay node 206, and a third relay node 207.

The aim of relay nodes (RN) 205, 206, 207 is generally to extend the coverage of a radio cell 203, 204 beyond the area that the base station 201, 202 spanning the radio cell 203, 204 can cover in a cost-efficient manner Examples are cell edge, coverage holes (e.g. rural areas, tunnels, "dead zones" in urban areas caused by destructive interference of radio waves), hot spots and in-house scenarios.

Specifically, in this example, at the cell edge and for better in-house coverage relay nodes 205, 206, 207 are used that basically amplify signals received from the first base station 201. For that purpose the relay nodes 205, 206, 207 have a receiver installed to receive the signals from the first base station 201 and to transmit these signals in a way that provides at least in proximity to the relay nodes nodes 205, 206, 207 better signal quality than provided by the original signal sent from the first base station 201.

In general, a relay node 205, 206, 207 may be seen as a smart base station (i.e. supporting a reduced amount of functionality compared to a regular base station 201, 202) characterized by lower output power, smaller number of antennas, less functionality and lower cost compared to a regular base station 201, 202. Relay nodes 205, 206, 207 may occur in deployments of different technical complexity. They may vary from simple repeaters that amplify the RF-signal sent by a base station 201, 202 in one or more specific frequency bands to complete relaying base stations 201, 202 such that basically a secondary cell is spanned (enlarging the original, primary radio cell 201, 202) and transmit the data in the spanned secondary cell that was received in the primary cell 201, 202.

The communication system 200 further includes a first mobile terminal 209, a second mobile terminal 210, a third mobile terminal 211, and a fourth mobile terminal 212.

In cellular communication systems such as the communication system 200 shown in FIG. 2, various positioning methods may be used known that allow an end user device, i.e. a mobile terminal 209 to 212, or the communication network (including a radio access network including base stations 201, 202 and relay nodes 205 to 207 and for example further including a core network as explained above with reference to FIG. 1) to estimate its location (i.e. its geographical position). Examples for such methods are satellite based methods like GPS (Global Positioning System), radio cell ID based methods and methods using the observed time difference of arrival (OTDOA) of signals received from different base stations 201, 202 via triangulation. Whereas GPS typically is the most reliable and accurate positioning method, it is only available in areas with line of sight to the satellites, so not for in-house scenarios (like in building 208). Further, radio cell ID based method are typically missing accuracy compared to the other methods. So, especially for in-house scenarios increasing quality of OTDOA measurements is desirable.

As positioning based applications and services become more popular it can be expected to be inacceptable for a user not to be able to use such a service in-house, e.g. in a big office building. It can thus be expected that in-house positioning will be a field of enhancements for the future. In scenarios like the mentioned office building it is likely that e.g. for a LTE communication system relay nodes will be used to increase coverage.

Accordingly, according to one embodiment, relay nodes are used and enabled for in-house positining (i.e. position estimation).

When a relay node is used in a radio cell, the usability of OTDOA methods between the relay node and the base station spanning the radio cell depends on the kind of relay node that is used. If each relay node spans its own cell with own resources and using an own cell ID, then OTDOA methods can be used to triangulate between different relay nodes and the base station because the mobile terminal is aware of receiving different signals from different base stations/relay nodes and can thus calculate its position from the time difference of signals received.

However, if a relay node is operating as a simple repeater a mobile terminal is not aware of receiving signals from the relay node. These amplified signals appear in the mobile terminal as one of multiple paths in a multipath environment. Triangulation between such a relay node and a base station may thus be not possible because the mobile terminal cannot distinguish between the originators of the signals.

According to one embodiment, the accuracy of OTDOA methods is increased, in particular when relay nodes are used that are configured as repeaters and are basically amplifying base station's signal without spanning an own (new, i.e. additional) radio cell. According to one embodiment, triangulation between a base station and one or more relay nodes within the same radio cell is allowed.

For example, in the scenario shown in FIG. 2, it is assumed that the first base station 201 and the second base station 202 transmit positioning reference signals to allow positioning via triangulation in first radio cell 203 and the second radio cell 204.

The mobile terminals receive the positioning reference signals which are available at their respective locations. For example, with the mobile terminal locations illustrated in FIG. 2, the first mobile terminal 209 receives the direct signal from the first base station 201 only the second mobile terminal 210 receives signals from the first relay node 205 and the first base station 201 the third mobile terminal 211 receives signals from the second relay node 206 and the third relay node 207 the fourth mobile terminal 209 receives signals from the second relay node 205, the third relay node 207, the first base station 201 and the second base station 202

The mobile terminals 209 to 212 may as well receive user data from the first base station 201 and the relay nodes 205 to 207, however none of the mobile terminals 209 to 212 will in this example receive user data from the second base station 202 since they are all assumed to be located in the first radio cell 203 and camp on the first base station 201.

It is assumed that the locations of the base stations 201, 202 and the relay nodes 205 to 207 are known to the communication network. For example, a server is located in the core network of the communication network (or a backbone of the communication network) which has stored useful information for positioning calculation in mobile terminals 209 to 212, e.g. locations of base stations 201, 202 and relay nodes 205 to 207, association between base stations and relay nodes (that is, which relay node is relaying the signals of which base station) and similar information. The server may be able to send parts of this information via broadcast, system information broadcast or in a dedicated way to the mobile terminals 209 to 212 to assist in position estimation.

According to one embodiment the mobile terminals 209 to 212 are enabled to estimate their location utilizing measurements of signals from relay nodes 205 to 207.

Figure 3:
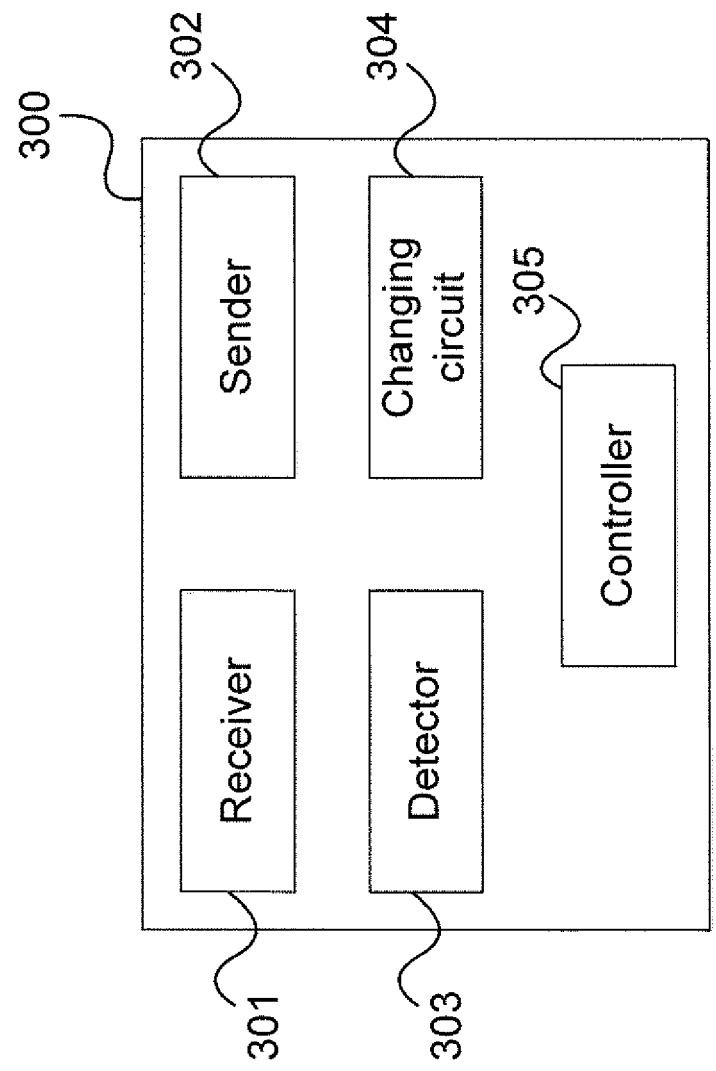
FIG. 3 shows a relay communication device according to an embodiment.

FIG. 3 shows a relay communication device 300 according to an embodiment.

The relay communication device 300 is for example part of a radio communication network, e.g. a cellular mobile communication network.

The relay communication device 300 includes a radio receiver 301 configured to receive data from a radio base station (e.g. of the radio communication network) and a radio sender 302 configured to send data received from the radio base station to at least one mobile terminal.

Further, the relay communication device 300 includes a detector 303 configured to detect whether a pre-determined transmission symbol sequence has been received from the radio base station and a changing circuit 304 configured to change the transmission symbol sequence such that from the change of the transmission symbol sequence an identification of the relay communication device 300 can be determined.

Additionally, the relay communication device 300 includes a controller 305 configured to control the radio sender configured to send the changed transmission symbol sequence to at least one mobile terminal.

According to one embodiment, in other words, a relay communication device 300 (or a relay node) is provided that forwards a transmission symbol sequence (such as a positioning reference signal symbol sequence) and changes the transmission symbol sequence in such a way that a receiver may determine that the transmission symbol sequence has been forwarded by the relay communication device (and has for example not been received by the receiver directly from the base station). According to one embodiment, this may be seen as a coding of an ID of the communication device into the transmission symbol sequence. The relay communication device is in one embodiment located in a mobile radio cell operated by the base station and increases the coverage area of the radio cell or the reception quality of signals to be sent to one or more mobile terminals in the radio cell by acting as an amplifier of the signals. In other words, according to one embodiment, the relay communication device does not itself operate its own radio cell but helps the base station with the distribution (i.e. the sending) of signals within the radio cell operated by the base station. According to one embodiment, the relay communication device leaves data (aside from the transmission symbol sequence) unchanged, and for example merely amplifies and re-sends signals received from the base station.

The relay communication device 300 may for example be arranged in a building. The transmission symbol sequence is for example the symbol sequence of a signal broadcast by the base station operating a radio cell in which the relay communication device is located. The relay communication device 300 may be configured to extend the coverage of this radio cell or to increase reception quality of signals sent by the base station for mobile terminals (or at least one mobile terminal) located and camped on the radio cell.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

According to one embodiment, the relay communication device and the base station are part of a cellular mobile communication network.

According to one embodiment, the transmission symbol sequence is the symbol sequence of a reference signal broadcast by the base station.

The transmission symbol sequence may be the symbol sequence of a positioning reference signal.

According to one embodiment, the transmission symbol sequence is received in each frame of a plurality of consecutive radio sub-frames and the controller is configured to control the radio sender to send the changed transmission symbol sequence in each sub-frame of the plurality of consecutive sub-frames.

The changing circuit may be configured to change the phase of at least a part of the symbols of the transmission symbol sequence.

According to one embodiment, the changing circuit is configured to change the phase of at least a part of the symbols of the transmission symbol sequence such that the phase of each symbol indicates a digit of a numerical representation of the identification of the relay communication device.

The relay communication device may further include a generator configured to generate another transmission symbol sequence and the changing circuit may be configured to replace the transmission symbol sequence by the other transmission symbol sequence.

For example, the generator is configured to generate the other transmission symbol sequence based on the identification of the relay communication device (e.g. to use a numerical representaiton of the identification of the initial value of a symbol sequence generation algorithm).

According to one embodiment, the changing circuit is configured to change the transmission symbol sequence by leaving out symbols from the transmission symbol sequence.

Figure 4:
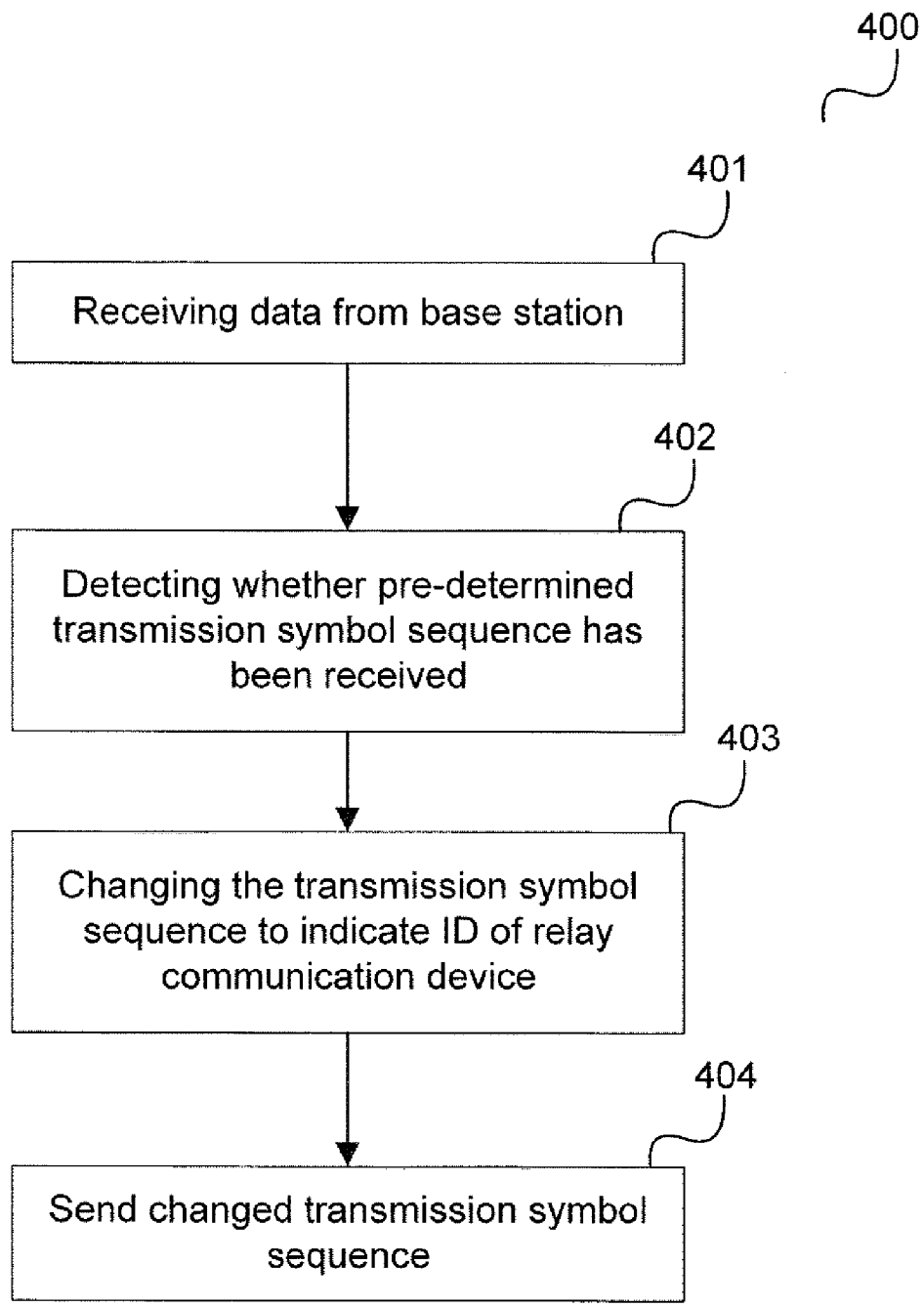
FIG. 4 shows a flow diagram according to an embodiment.

The relay communication device 400 for example carries out a method as illustrated in FIG. 4.

FIG. 4 shows a flow diagram 400 according to an embodiment.

The flow diagram 400 illustrates a method for relaying data.

In 401, data are received by a relay communication device (e.g. the relay communication device 300 shown in FIG. 3) from a radio base station.

In 402, it is detected whether a pre-determined transmission symbol sequence has been received from the radio base station.

In 403, the transmission symbol sequence is changed such that from the change of the transmission symbol sequence an identification of the relay communication device can be determined.

In 404, the changed transmission symbol sequence is sent to at least one mobile terminal.

An example for a mobile terminal to which the changed transmission symbol sequence is sent is described in the following with reference to FIG. 5.

Figure 5:
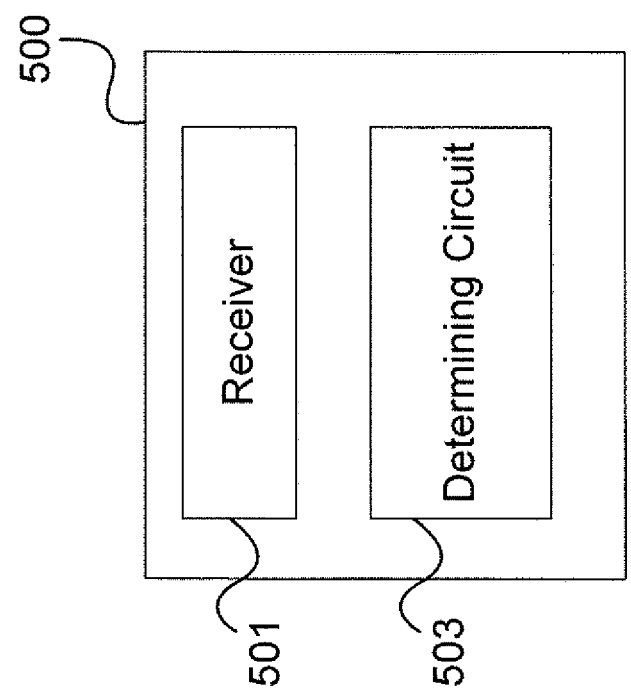
FIG. 5 shows a mobile terminal according to an embodiment.

FIG. 5 shows a mobile terminal 500 according to an embodiment.

The mobile terminal 500 includes a radio receiver 501 configured to receive a transmission symbol sequence and a determining circuit 502 configured to determine whether the transmission symbol sequence has been changed with regard to a reference transmission symbol sequence and to ascertain, based on the result of the determination, whether the transmission symbol sequence was received from a relay communication device or from a base station.

According to one embodiment, the determining circuit is configured to ascertain that the transmission symbol sequence was received from a relay communication device if it has been determined that the transmission symbol sequence has been changed with regard to a reference transmission symbol sequence and to ascertain that the transmission symbol sequence was received from a base station if it has been determined that the transmission symbol sequence has not been changed with regard to a reference transmission symbol sequence.

The determining circuit may be configured to determine whether the transmission symbol sequence has been changed with regard to a reference transmission symbol sequence by comparing the received transmission symbol sequence with the reference transmission symbol sequence.

The mobile terminal may further include an estimating circuit configured to estimate the position of the mobile terminal based on the reception of the transmission symbol sequence and based on whether it was received from a relay communication device or a base station.

According to one embodiment, the estimating circuit is configured to estimate the position of the mobile terminal using triangulation based on signals received from base stations, relay communication devices, or both.

Figure 6:
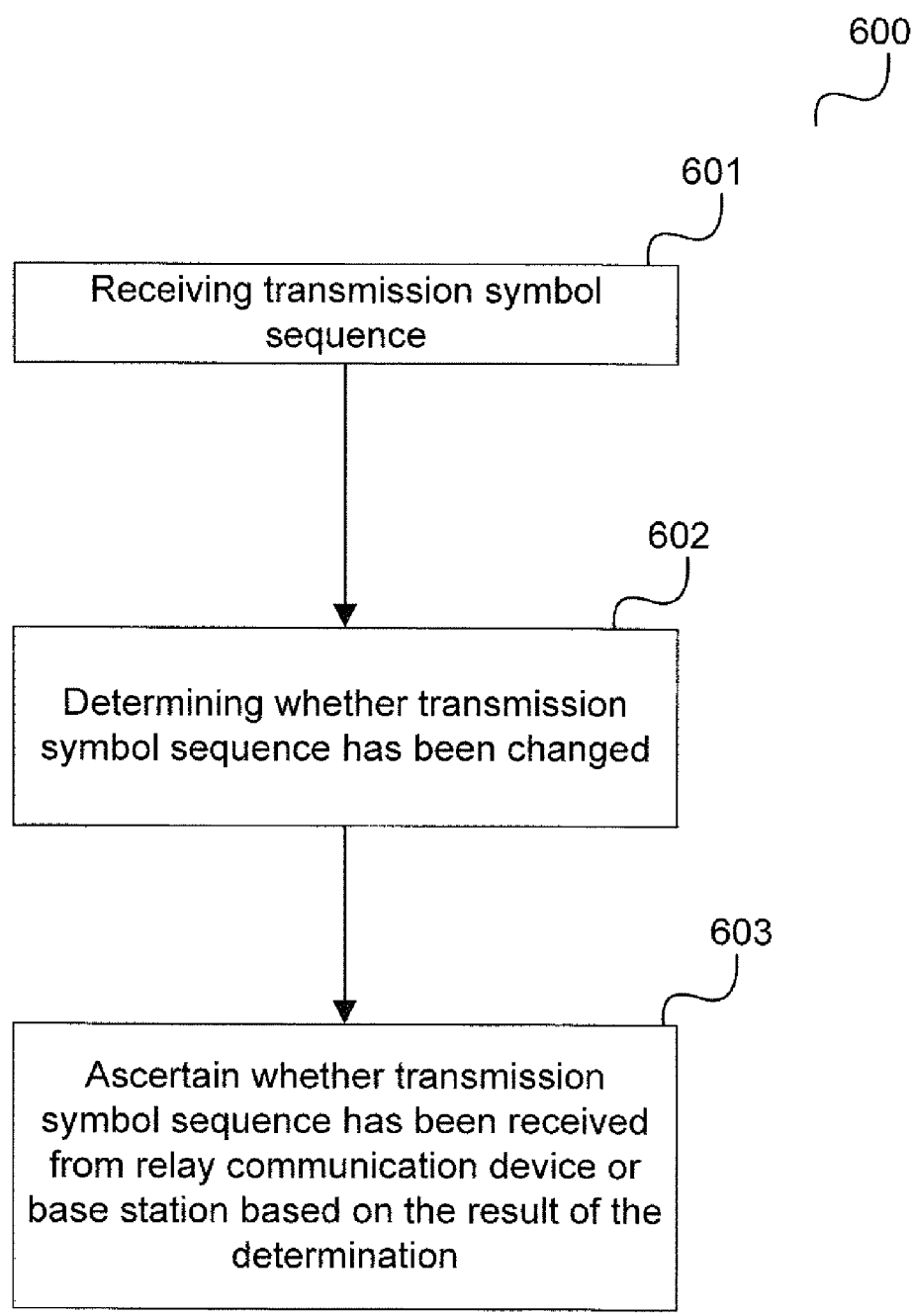
FIG. 6 shows a flow diagram according to an embodiment.

The mobile terminal 500 for example carries out a method as illustrated in FIG. 6.

FIG. 6 shows a flow diagram 600 according to an embodiment.

The flow diagram 600 illustrates a method for determining a sender of a signal.

In 601, a transmission symbol sequence is received.

In 602, it is determined whether the received transmission symbol sequence has been changed with regard to a reference transmission symbol sequence.

In 603, it is ascertained, based on the result of the determination, whether the transmission symbol sequence was received from a relay communication device or from a base station.

According to one embodiment, in other words, a relay node is enhanced beyond its function as simple amplifier to support OTDOA methods but still with reduced complexity compared to a regular base station, i.e. a full base station for operating a mobile radio cell.

According to one embodiment, a relay node adapts signals that it receives from a base station and that it amplifies and forwards in a way that allows the receiving device to determine which specific relay node of all relay nodes in the radio cell operated by the base station has transmitted (forwarded) the signal and to determine whether the signal was directly received from the base station.

With the capability of identifying the relay node that was the transmitter of the received signals (in other words the final transmitter of the signal before being received by the mobile terminal) the mobile terminal can estimate its position from time difference measurements of signals received from the relay node and from other network components such as the base station or other base stations and other relay nodes.

In case that one of the signals is received from a relay node, the measured time differences will still relate to the timing between the base station and the mobile terminal. This is illustrated in FIG. 7.

Figure 7:
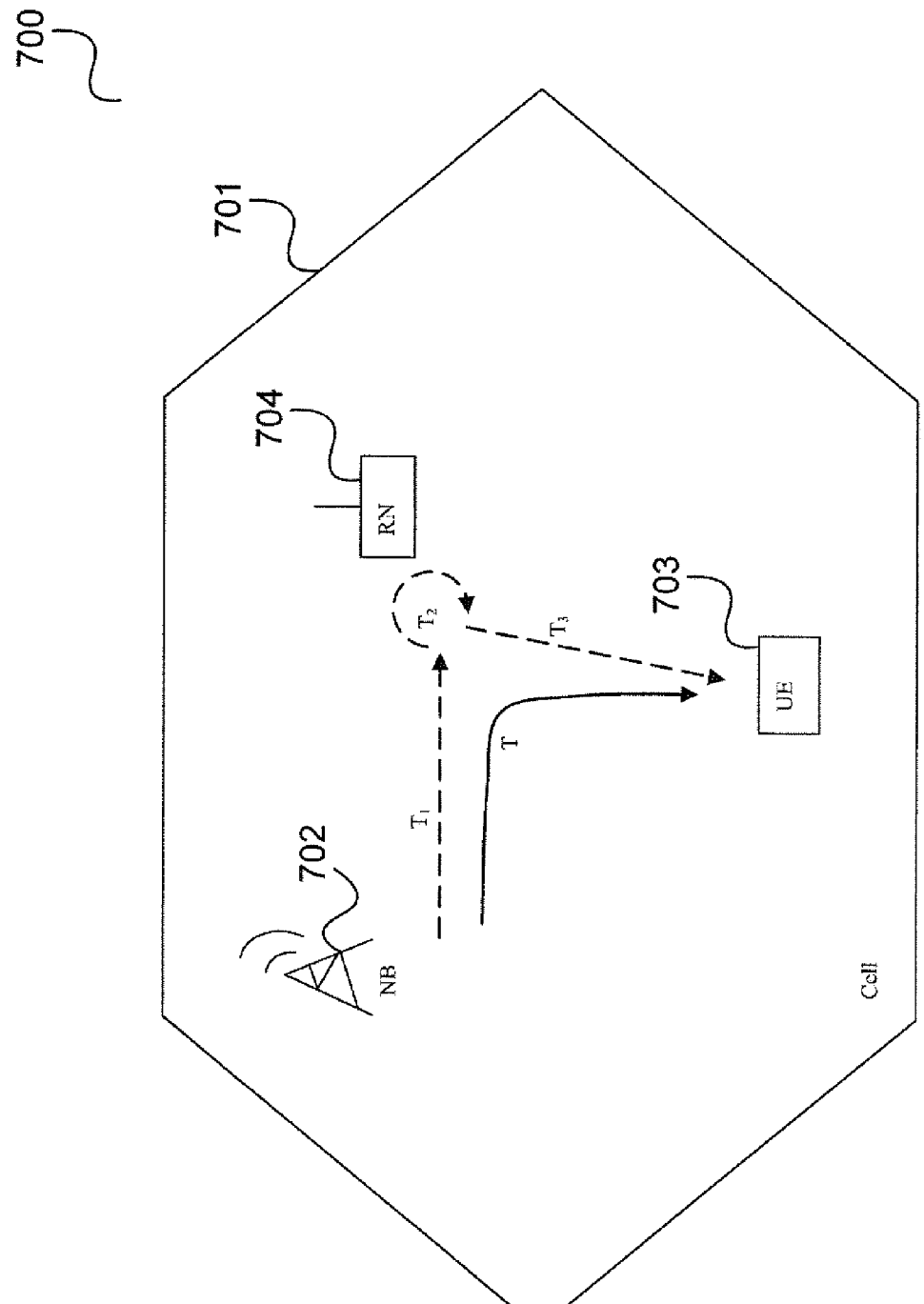
FIG. 7 shows a communication arrangement according to an embodiment.

FIG. 7 shows a communication arrangement 700 according to an embodiment.

The communication arrangement 700 includes a radio cell 701 for example corresponding to the first radio cell 203 operated by base station 702 for example corresponding to the first base station 201.

A mobile terminal 703 is located in the radio cell 701. Further, a relay node 704 is located in the radio cell 701 and relays (downlink) signals transmitted by the base station 702.

As illustrated in FIG. 7, the total time difference T between the sending of a signal by the base station 702 and the reception thereof by the mobile terminal 703 (i.e. the total transmission delay of the signal) includes the transmission delay $T_1$ between the base station 702 and the relay node 704, the processing delay in the relay node $T_2$ and the (final) transmission delay between the relay node 704 and the mobile terminal $T_3$.

As $T_3$ allows estimation of the mobile terminal's location relative to the relay node, the mobile terminal 703 that measures T for a signal needs to determine $T_3$ for calculation of its position from T. For this, the mobile terminal 703 requires the parameter $T_A=(T_1+T_2)$. Accordingly, according to one embodiment, the communication network determines $T_A$ using measurements between base station 702 and relay node 704 and signals $T_A$ to the mobile terminal 703, e.g. together with the information about existence of relay nodes and other assistance data in the radio cell 701 to the mobile terminal 703 before position estimation takes place.

The mobile terminal 703 may than associate a timing measurement $T_3$ determined for a signal with the relay node 704 (or, if the signal was received directly from the base station 702 with the base station 702) and thus, doing that for signals received from different relay nodes and/or base stations build up a set of time difference (i.e. timing or time delay) measurements suitable for calculation of an estimated position of the mobile terminal 703 using a triangulation algorithm.

According to one embodiment the transmission symbol sequence changed by the changing circuit 304 of the relay communication device 300 is a positioning reference signal according to LTE.

According to one embodiment, in line with LTE, a base station (e.g. base station 201, 202, 702) regularly transmits control information and as a part of this also so called reference signals. For each radio cell 203, 204, 701 the reference signals are sent on specially fixed resources (time and frequency/OFDM carrier resources) and the data sent is also fixed, namely so called reference sequences. A mobile terminal 209 to 212, 703 receiving downlink information knows when (e.g. in which radio frames and transmission slots) and where (e.g. on which frequency carriers) it should expect a certain sequence. With that knowledge the mobile terminal 209 to 212, 703 can receive reference signals and analyze the received signal to verify the radio cell ID and estimate timing, frequency and power of received signals.

For LTE, there are reference signals defined that are especially used for positioning, also referred to as positioning reference signals. A positioning reference signal includes a transmission symbol sequence (also referred to as (positioning) reference signal sequence) which is, according to one embodiment in line with LTE, given by the following:

The reference signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, 2N_{RB}^{max,DL} - 1$$

where $n_s$ is the transmission slot number within a radio frame, l is the OFDM symbol number within the transmission slot. The sequence c(i) is a pseudo-random sequence. It is generated by initialization a pseudo-random sequence generator with (equation 2)

$$c_{init} = 2^{10} \cdot (7 \cdot (n_s+1) + l+1) \cdot (2 \cdot N_{ID}^{cell}+1) + 2 \cdot N_{ID}^{cell} + N_{CP} \quad (2)$$

at the start of each OFDM symbol where $$N_{CP} = \begin{cases} 1 & \text{for normal cylic prefix} \\ 0 & \text{for extended cyclic prefix} \end{cases} \quad (3)$$

As can be seen the pseudo random sequence c(i) is initiated in a cell-specific way based on the parameter $N_{ID}^{cell}$ which is the identification of the radio cell (in which the resulting reference signal sequence is to be sent) and is then used to build the complex-valued reference signal sequence. From the definition of the pseudo-random sequence c(i) and the initialization of this sequence with $c_{init}$ it can be seen that the sequence c(i) is for example generated by initializing a register with $c_{init}$ and using this register for generating the sequence c(i). According to one embodiment, in line with LTE, the register is of size 31 bit whereas the formular for calculating $c_{init}$ above always results in bits 28 to 30 to be zero, i.e. $c_{init}$ above is always smaller than $2^{28}$.

Figure 8:
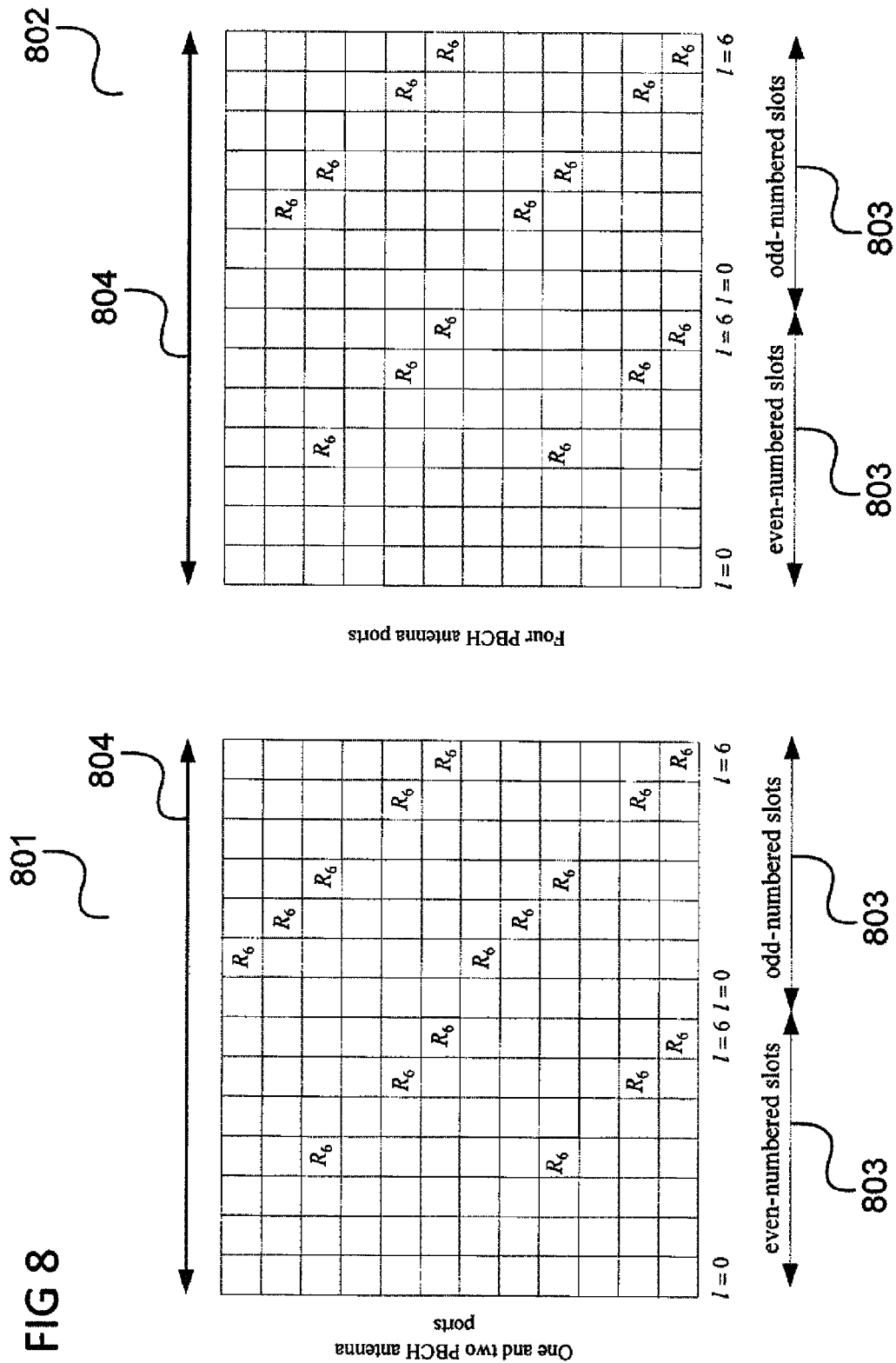
FIG. 8 shows a first resource allocation diagram and a second resource allocation diagram.

According to one embodiment, in line with LTE, the sequence $r_{l,n}(m)$ is transmitted on the available radio resources as for example shown in FIG. 8.

FIG. 8 shows a first resource allocation diagram 801 and a second resource allocation diagram 802.

The first resource allocation diagram 801 and the second resource allocation diagram 802 each show the symbol allocation for one sub-frame 804, each sub-frame 804 including two slots 803 (one representing the even-numbered slots and one representing the odd-numbered slots).

It should be noted that according to one embodiment, in line with LTE, transmission is carried out in accordance with a frame structure wherein each frame is 10 ms long and consists of 20 slots 803 of length 0.5 ms. A subframe 804 is defined as two consecutive slots 803.

In the examples illustrated in FIG. 8 the slot format is such that each slot 803 includes 7 OFDMA symbols (numbered from 0 to 6). A combination of one subcarrier and one OFDM symbol is denoted as one resource element and 12 carriers over one slot together build one physical resource block consisting of 84 resource elements.

The first resource allocation diagram 801 illustrates the symbol allocation for sending the positioning reference signal sequence (i.e. which resource elements are assinged the values of the reference signal sequence $r_{l,n}(m)$) when two transmit antennas are used. The allocated resource elements for sending the positioning reference signal sequence are indicated by "R6" in the first resource allocation diagram 801. As indicated, in the case of two transmit antennas, 16 resource elements are allocated for transmitting the positioning reference signal sequence.

The second resource allocation diagram 802 illustrates the symbol allocation for sending the positioning reference signal sequence (i.e. which resource elements are assinged the values of the reference signal sequence $r_{l,n}(m)$) when four transmit antennas are used. The allocated resource elements for sending the positioning reference signal sequence are indicated by "R6" in the second resource allocation diagram 802. As indicated, in the case of two transmit antennas, 14 resource elements are allocated for transmitting the positioning reference signal sequence.

All resource elements showed as blank in the resource allocation diagrams 801, 802 may or may not be used to transport downlink shared channel or other information.

Other mappings (e.g. for certain MIMO configurations or extended cyclic prefix usage) maybe used. For example, a plurality of mapping are pre-defined and are applied depending on the current communication situation (e.g. implicitly derived from or configured according to the current situation in the radio cell). According to one embodiment, to increase likelihood of successful reception a positioning reference signal (i.e. a positioning reference symbol sequence) is transmitted in each of a number of $N_{PRS}$ consecutive sub frames. Further, the sending of a positioning reference signal in a plurality of consecutive sub-frames may itself be periodically repeated (e.g. after a plurality of sub-frames without sending the positioning reference signal), e.g. with a periodicity being configured by the communication network. In other words, a positioning reference signal may be sent in a "burst" of $N_{PRS}$ sub frames each including the positioning reference signal wherein this "burst" is periodically repeated (e.g. after a pause of a certain number of sub frames).

According to an embodiment, a relay node may for example adapt a positioning reference signal by A. a relay node specific masking of resource elements used for positioning reference signals B. the use of a relay node specific symbol sequences for positioning reference signals C. adapting the phase of the positioning references signals.

For example, in the communication arrangement 200 shown in FIG. 2, the base stations 203, 204 transmit their control and data signals in the downlink to the mobile terminals 209 to 212 in the radio cells 203, 204. The relay nodes 205, 206, 207 receive the signals from the first base station 203, amplify and transmit them but before transmitting, at least a part of the signals (in this embodiment the positioning reference signals) is adapted (i.e. changed) to allow identification of the relay nodes which sent the signals (e.g. the positioning reference signals). This may be done according to the above items A, B or C and is described in more detail in the following.

A. Relay Node Specific Masking of Resource Elements Used for Positioning Reference Signals.

According to the embodiment described in the following, the relay nodes 205, 206, 207 only transmit a part of the positioning reference signals and leave out parts of the positioning reference signals (i.e. leave out symbols of the reference symbol sequence). For example, some of the resource elements that would carry parts of the reference symbol sequence (e.g. according to the resource allocation illustrated in FIG. 8) are just left blank (i.e. are not used to transmit anything) such that in effect, parts of the reference symbol sequence are left out.

Which parts are transmitted and which are left blank is different for the different relay nodes 205, 206, 207 such that the relay node 205, 206, 207 sending the reference symbol sequence with missing parts (i.e. the changed reference symbol sequence) can be determined from the information which parts are missing. For this, the respective configuration of the relay nodes 205, 206, 207, i.e. the information which relay node 205, 206, 207 is configured to leave out which parts, is also known to the mobile terminals. For example, this information is transmitted to the mobile terminals 209 to 212 as a part of the assistance information from the positioning server as mentioned above. In the following, an example how the three relay nodes 205, 206, 207 differently leave out parts of the reference symbol sequence is described with reference to FIG. 9, e.g. in the case of two transmit antennas in which, as illustrated in the first resource allocation diagram 801 of FIG. 8, the base stations 201, 202 send out the reference symbol sequences using 16 resource elements per sub-frame 804.

Figure 9:
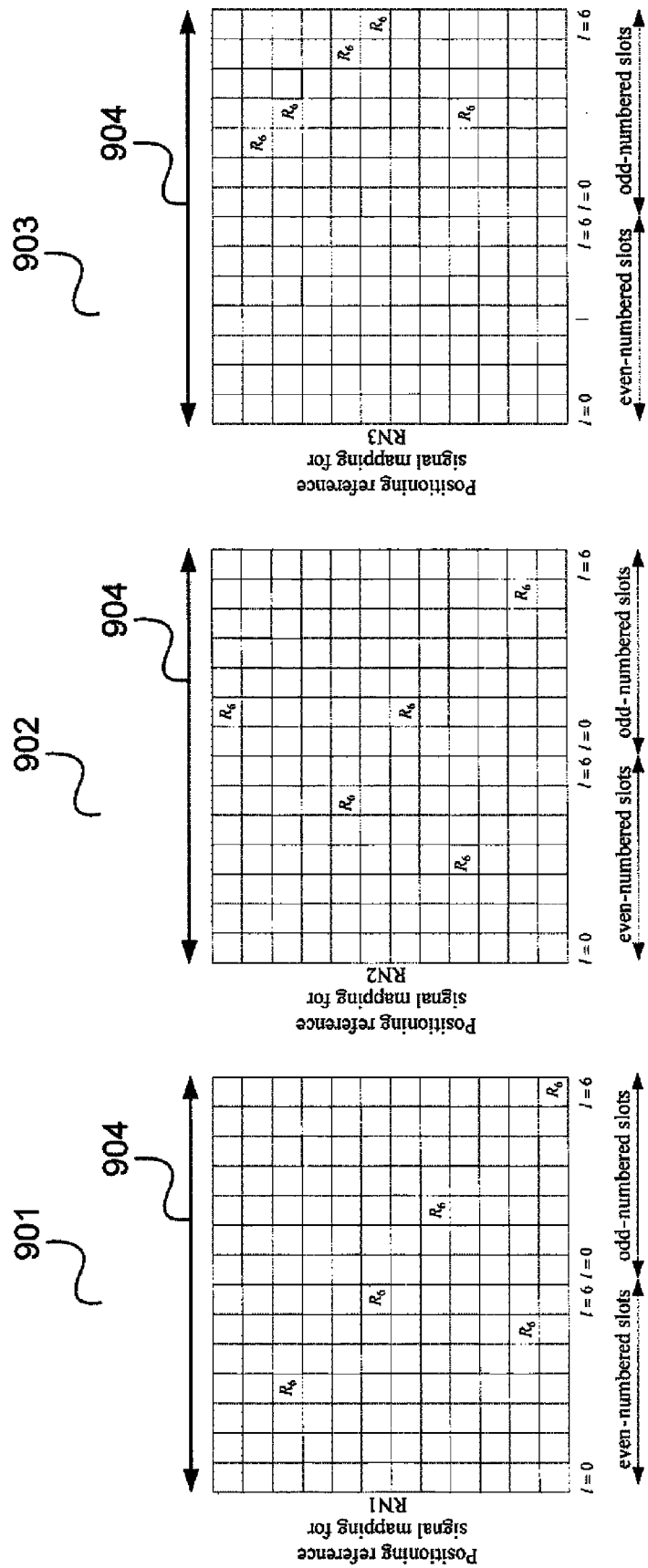
FIG. 9 shows a first resource allocation diagram, a second resource allocation diagram, and a third resource allocation diagram.

FIG. 9 shows a first resource allocation diagram 901, a second resource allocation diagram 902, and a third resource allocation diagram 903.

The first resource allocation diagram 901 for example corresponds to the resource allocation used by the first relay node 205 for sending the reference symbol sequence.

The second resource allocation diagram 902 for example corresponds to the resource allocation used by the second relay node 205 for sending the reference symbol sequence.

The third resource allocation diagram 903 for example corresponds to the resource allocation used by the third relay node 205 for sending the reference symbol sequence.

Analogously to the first resource allocation diagram 801 shown in FIG. 8, the resource allocation diagrams 901, 902, 903 each show the resource allocation for one sub-frame 904, each sub-frame 904 in including two slots, and for 12 sub carriers.

As illustrated in FIG. 9, only five of the 16 resource elements that are used by the base stations 201, 202 for transmitting positioning reference signals are used by the relay nodes 205, 206, 207.

The configuration of the relay nodes 205, 206, 207 with respect to the resource allocation for sending out the positioning reference signals is made known to the mobile terminals 209 to 212.

In the arrangement as shown in FIG. 2, the first mobile terminal 209 receives the positioning reference signals directly from the first base station 201 in accordance with the first radio resource allocation diagram 801 of FIG. 8, i.e. receives the reference symbol sequence with no missing parts and can use them for positioning estimation in the usual way.

The second mobile terminal 210 receives an overlay of the signals sent by the first base station 201 and the first relay node 205. Now, the second mobile terminal 210 has several possibilities to analyze the received signals.

First of all it can assume to receive the signal from one of the transmitters (first base station 201 and the first relay node 205) significantly earlier than from the other (i.e. with less transmission delay), provided it is not located in the small area in which the transmission delay of signals received from the first base station 201 equals the transmission delays plus the processing delay of signals received via the first relay node 205. Also, the second mobile terminal 210 can assume to receive signals from one of the transmitters significantly better than from the other (i.e. at higher reception power).

The second mobile terminal 210 may thus analyze whether the reception power level difference and/or the reception delay difference between received reference signal parts included in different resource elements (i.e. transmitted using different resource elements) matches any of the known positioning reference signals sent by one of the relay nodes 205 to 207 and thus derive an association between reference signals and transmitters (i.e. in this case an association of the received reference signals with the first base station 201 and the first relay node 205).

Then second mobile terminal 210 can use time delay measurements of the reference signals sent by the first base station 201 and by the first relay node 105 and the known location and timing of the first base station 201 and the first relay node 205 to estimate its own position. As the triangulation only works when at least transmission delay of two transmitters at different locations is known, this allows a precise position estimation, while this would not be possible based only on the signal received from the first base station 201. It should further be noted that even if the assumptions by the second mobile terminal 210 of different power level and delay was wrong in a specific situation, the estimation may still have sufficient accuracy.

An alternative to calculating the position from estimated transmission delay with triangulation algorithms as above is simply to assume proximity to the first relay node 205 when the transmission power and/or transmission delay pattern of a received reference signal matches the positioning reference signal resource element pattern of the first relay node 205 (i.e. matches the pattern of resource elements including parts of the reference signal, e.g. as illustrated in the second resource allocation diagram 902). Even the position estimate "proximity to the first relay node 205" may be more precise than an OTDOA measurement based on reference signals received over relay nodes but not being identified as being received over relay nodes but assumed to be received from a base station.

The third mobile terminal 211 receives an overlay of the reference signals sent by the second relay node 210 and the third relay node 207. As described above for the second mobile terminal 210 above the power level distribution over the received radio resource elements for positioning reference signals as well as the respective transmission delay distribution can be used by the third mobile terminal 211 to identify the reference signals of the relay nodes 206, 207. Then the time of arrival measurements (i.e. transmission delay measurements) for each relay node 206, 207 can be used together with the known information to triangulate the position of the third mobile terminal 211.

The fourth mobile terminal 212 receives signals from the second relay node 206, the third relay node 207, the first base station 201 and the second base station 202. The signals of the relay nodes 206, 207 may in this example be weak because the fourth mobile terminal 212 is assumed to be located outside the building 208 while the relay nodes 206, 207 are assumed to be inside the building 208. The signals from the first base station 201 and the second base station 202 may in this example also be weak since the fourth mobile terminal 212 is assumed, as illustrated, to be located near the edge of both the first radio cell 203 and the second radio cell 204.

This may for example result in that the fourth mobile terminal 212 receives an overlay of positioning reference signals from the first base station 201 and the relay nodes 206, 207 from which the fourth mobile terminal 212 will probably not be able to determine any specific relay node as the sender of a signal present in the overlay and it will thus conclude that the received signal is the reference signal received directly from the first base station 201. It should be noted that due to the different cell IDs, the fourth mobile terminal 212 may be able to separate the reference signal received from the second base station 202 from the overlay of the signals from the first base station 201 and the relay nodes 206, 207. The reference signal in the overlay of reference signals from first base station 201 and the relay nodes 206, 207 that will be received first will probably be the one sent on the direct path from the first base station (because of the processing delay in the relay nodes) and so timing measurements will be as good as if only the reference signal from the first base station 201 would be present (in addition to the reference signal received from the second base station 202).

B. Use of Relay Node Specific Sequences for Positioning Reference Signals

According to the embodiment described in the following, as alternative to relay node-specific masking of resource elements used for positioning reference signals as described above with reference to FIG. 9, a relay node 205 to 207 may change the symbols of the symbol sequence that is sent as positioning reference signal itself in a way that is specific for the respective relay node 205 to 207 for allowing a receiver to identify the relay node 205 to 207 that has sent the changed symbol sequence. For example, the symbol sequence according to equations (1) and (2) above is adapted by a relay node 205 to 207 to be not only cell specific ($N_{ID}^{cell}$) but also specific for the relay node. The association of symbol sequences to relay nodes 205 to 207 would then be signalled to the relay nodes 205 to 207 as well as to the mobile terminals 209 to 212.

For example, according to one embodiment, As one example, the symbol sequence according to equations (1) and (2) is adapted by a relay node 205 to 207 by slightly changing the initialization value in the following way $$c_{init} = 2^{10} \cdot (7 \cdot (n_s+1)+l+1) \cdot (2 \cdot N_{ID}^{cell}+1) + 2 \cdot N_{ID}^{cell} + N_{CP} + 2^{28} \cdot N_{RN/NB}^{cell} \quad (4)$$

Compared to equation (2), a parameter $N_{RN/NB}^{cell}$ has been added. This parameter allows to identify reference signals transmitted by the first base station 201 where $N_{RN/NB}^{cell}=0$ (in this case, the symbol sequence is equal to the one based on equations (1) and (2)). In each relay node a different value for $N_{RN/NB}^{cell}$ is used (e.g. from $\{1,2 \ldots 7\}$) to distinguish between reference signals from up to 7 relay nodes and the first base station 201 and still not corrupting the orthogonality of the positioning reference signals.

Because the positioning reference sequences allocated to the relay nodes 205 to 207 in the first radio cell 203 are orthogonal to each other and to the positioning reference sequence sent by the first base station 201, the mobile terminals 209 to 212 can match a received symbol sequence to the symbol sequences sent by the first base station 201 and the relay nodes 205 and 207 (as "candidate" symbol sequences for matching) and can thus derive who (i.e. which network component: which relay node or which base station) is the originator of the received symbol sequence. Similar to the relay node-specific masking of resource elements used for positioning reference signals as described above with reference to FIG. 9 (item A above), the mobile terminals 209 to 212 can with this knowledge and the assistance information (base station location, relay node location etc.) estimate its own position.

C. Adapting the Phase of the Positioning References Signals

According to one embodiment, a relay node 205 to 207 changes the phase of a positioning reference signal received from the first base station 201 to indicate that it is the transmitter of the reference signal. According to one embodiment, changes of the phase are possible without corrupting the reference signal such that it can no longer used because the reference signal information (i.e. the symbol sequence to be expected) is known to the mobile terminals 209 to 212 (e.g. may be determined by the mobile terminals 209 to 212 according to equation (1) and (2)) and autocorrelation is used to eliminate interference and/or multipath effects and derive the exact timing (and thus the transmission delay of the reference signal). The applied autocorrelation will not suffer from switching phase as the switched phase is contant during the correlation period or the switching phase pattern is known by the receiver.

For example, for the identification of the sender of a positioning reference signal, a sender (or transmitter) ID is for example defined as a parameter with values $\{0,1,\ldots,m\}$ that allows to distinguish the first base station 201 (value 0) and m different relay nodes. For example, for each of relay nodes 205 to 207 a different number between 1 and m is configured (i.e. defined) as ID such that each relay node 205 to 207 has a specific ID configured by the communication network. According to its ID, a relay node 205 to 207 may change the phase of a positioning reference signal and thus in effect map its ID onto the phase of the reference signal as described in the following.

According to one embodiment, a coefficient vector C is defined representing the transmitter ID so that each coefficient $c_i$ (i=0 ... n with $m<=2^n$) represents a single bit of the ID. The $c_i$ can then be "impressed" onto (i.e. coded into) a reference signal for example according to one of the following ways.

As described above, according to one embodiment, positioning reference signals are transmitted with a certain periodicity and in each of $N_{PRS}$ consecutive sub frames, with $N_{PRS}$ for example being configured by the communication network. According to one embodiment, n is chosen as $N_{PRS}$ and the phase of the reference signal in consecutive sub frames (of the $N_{PRS}$ sub frames of a "burst") is shifted by 0° if $c_i=0$ and by 180° if $c_i=1$. The phase of all reference symbols in one sub frame are according to this embodiment shifted by the same factor (0° or 180°). This is illustrated in FIG. 10.

Figure 10:
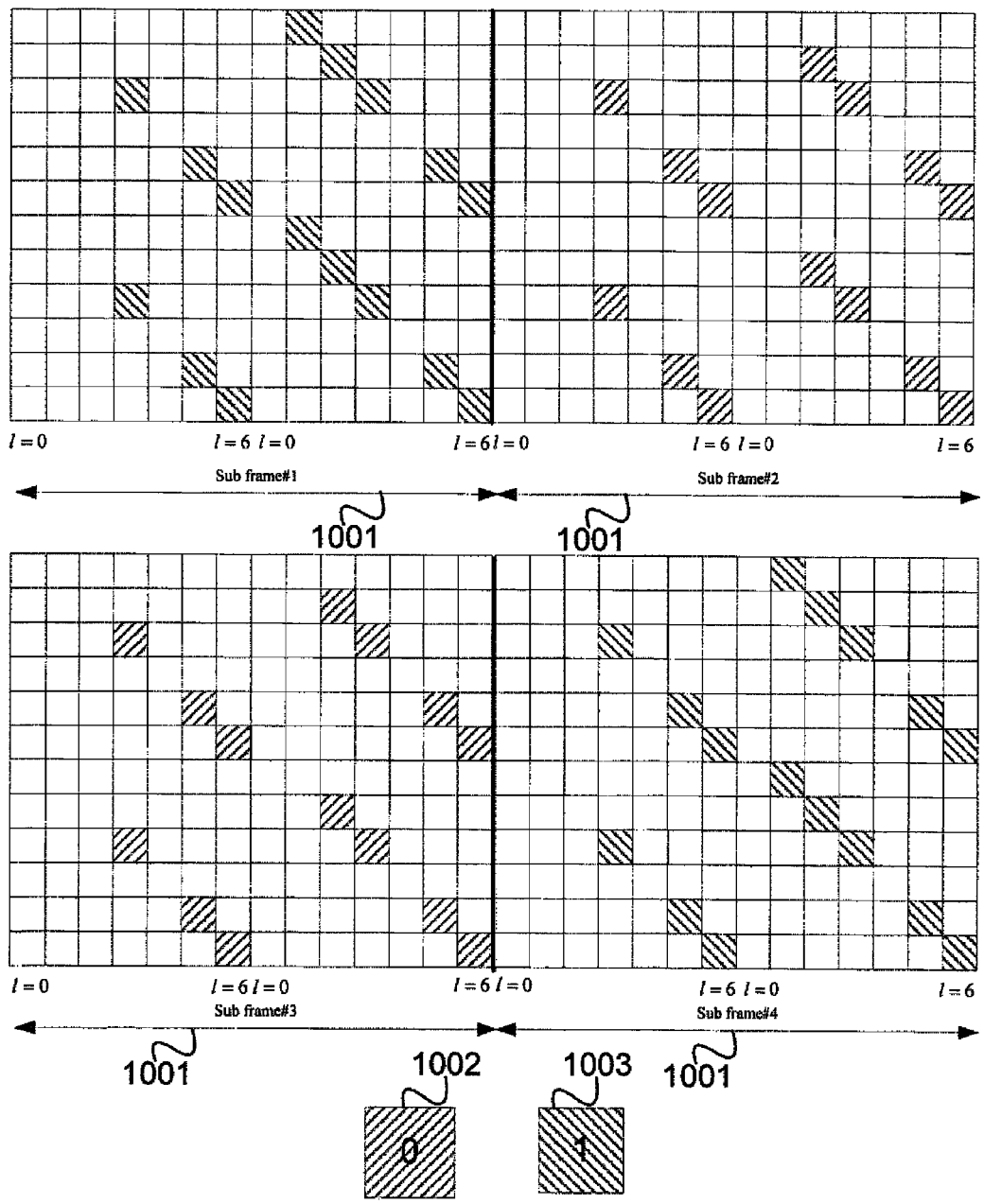
FIG. 10 shows a resource allocation diagram.

FIG. 10 shows a resource allocation diagram 1000.

The resource allocation diagram 1000 shows the resource allocation for four sub frames 1001 (numbered 1 to 4), each sub frame 1001 includes two slots and 12 sub carriers.

A first hatching 1002 indicates resource elements to which symbols are assigned that are not phase shifted and as second hatching 1003 indicates resource elements to which symbols are assigned that are phase shifted by 180°. As no shift in a sub frame 1001 indicates a binary 0 and a phase shift of 180° in a sub frame 1001 indicates a binary 1 it can be seen that the phase shifts in the sub frames 1001 represent a transmitter ID of $1001_{binary}=9_{dec}$ and thus for example that the reference signal has been sent by relay node number 9 assuming that ID=0 represents the base station and a relay node with number i is represented by ID=i. In other words, in this example, the bits of the binary representation of the ID are imprinted on the sub frames by shifting the phase of sub frame #1 and #4 by 180° (representing bits equal to 1) and keeping the phase of sub frames #2 and #3 unchanged (representing bits equal to 0).

Alternatively, according to one embodiment, each transmitted symbol of the positioning reference signal is shifted in phase representing one coefficient $c_i$, i.e. the phase of one single reference symbol represents one coefficient $c_i$. Thus, it may be possible to impress the full transmitter ID to a single sub frame or even a single slot. The changed reference symbol sequence (i.e. including the symbols phase shifted according to the transmitter ID) can be cyclically repeated (e.g. sent in a plurality of consecutive sub frames) to increase the likelihood of correct transmitter ID detection.

The coding of the transmitter ID in one single sub frame in this way is illustrated in FIG. 11.

FIG. 11 shows a resource allocation diagram 1100.

The resource allocation diagram 1100 shows the resource allocation for one sub frame 1101 including two slots, and for 12 sub carriers.

A first hatching 1102 indicates resource elements to which symbols are assigned that are not phase shifted and as second hatching 1103 indicates resource elements to which symbols are assigned that are phase shifted by 180°.

As no shift in a sub frame 1101 indicates a binary 0 and a phase shift of 180° in a sub frame 1001 indicates a binary 1 it can be seen that the phase shifts in the sub frame 1101 represent a transmitter ID of $10110111_{binary}$ that is impressed in the first eight symbols from top to bottom and from left to right. This sequence of phase shifts is simply repeated on the next 8 symbols available (again from top to bottom and from left to right) to increase detection likelihood.

It should be noted that a phase shift by 0° (e.g. for encoding a binary 0 of the transmitter ID) of a symbol of the reference symbol sequence can be seen as a multiplication of the symbol by $e^{j\cdot 0}=+1$, i.e. leaving the symbol unchanged, and a phase shift by 180° (e.g. for encoding a binary 1 of the transmitter ID) of a symbol of the reference symbol sequence can be seen as a multiplication of the symbol by $e^{j\cdot 0}=-1$.

It should be noted that in the approach described above with reference to FIG. 10 where the phase of sequence symbols is changed per sub frame (i.e. the phase change is the same for all symbols in the sub frame), a mobile terminal 209 to 212 that is aware of the usage of phase changes for transmitter ID encoding may receive the reference symbol sequence without problem and determine the phase changes and thus the transmitter ID. However, a legacy mobile terminal which correlates the positioning reference signals of a plurality of consecutive sub frames may have problems receiving the positioning reference signals with this approach since a positioning reference signal of a sub frame having a phase change of 0° (i.e. multiplied by +1) would, in the correlation, cancel out the (same) positioning reference signal transmitted in a following sub frame having a phase change of 180° (i.e. multiplied by −1). Therefore according to one embodiment, an approach is used in which for all sub frames of a positioning reference signal burst, the same phase change (if any) is applied to the positioning reference symbol sequence. Thus, a legacy mobile terminal (e.g. a legacy UE) would do the correlation over sub frames for which the same phase change is used and thus have no problems receiving the positioning reference signals. This approach is illustrated in FIG. 12.

FIG. 12 shows a resource allocation diagram 1200.

The resource allocation diagram 1200 shows the resource allocation for a first sub frame 1201, a second sub frame 1202, a third sub frame 1203, and a fourth sub frame 1204, each sub frame 1201 to 1204 including two slots and 12 sub carriers.

The first sub frame 1201 and the second sub frame 1202 are assumed to form a first positioning reference signal burst and the third sub frame 1203 and the fourth sub frame 1204 are assumed to form a second positioning reference signal burst. This means that $N_{PRS}$ is equal to two in this example. The first positioning signal burst and the second positioning reference signal burst are for example separated by a plurality or multiplcity of sub frames without sending the positioning reference signal.

A first hatching 1205 indicates resource elements to which symbols are assigned that are not phase shifted and as second hatching 1206 indicates resource elements to which symbols are assigned that are phase shifted by 180°. As illustrated, the phase shift applied (if any) is equal for all symbols and sub frames of one reference positioning signal burst. In this example, the transmitter ID encoded using the phase changes is for example the $01_{binary}$. More than two consecutive reference positioning signal bursts may be used for transmitter ID encoding to be able to encode a higher number of transmitter IDs.

It should be noted for determining the phase the mobile terminals 209 to 212 may do a comparison with the known values of the downlink reference signals.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio relay communication device comprising:
   a radio receiver configured to receive data from a radio base station;
   a radio sender configured to send data received from the radio base station to at least one mobile terminal;
   a changing circuit configured to:
      receive a signal from the radio base station, via the radio receiver;
      adapt the signal to enable identification of the radio relay communication device by the at least one mobile terminal, wherein to adapt the signal includes phase changing the signal, wherein: the phase changing is specific to the radio relay communication device; the phase changing the signal includes phase shifting one or more subframes of a plurality of subframes contained within the signal; the phase shifting of the one or more subframes is 180°; and a phase of each subframe of the plurality of subframes indicates a digit of a numerical representation of an identity of the radio relay communication device; and
   a controller to control the radio sender to send the adapted signal to the at least one mobile terminal.

2. The radio relay communication device according to claim 1, wherein the radio relay communication device and the base station are part of a cellular mobile communication network.

3. The radio relay communication device according to claim 1, wherein the signal is a reference signal broadcast by the base station.

4. The radio relay communication device according to claim 1, wherein the signal is a positioning reference signal.

5. The radio relay communication device according to claim 1, wherein to adapt the signal includes the application of the phase change to the signal, wherein application of the phase change to the signal includes a phase shift of one or more symbols of a plurality of symbols contained within a subframe of the signal, and wherein the phase of each symbol indicates a digit of a numerical representation of an identity of the radio relay communication device.

6. The radio relay communication device according to claim 1, wherein the signal is a first signal and the changing circuit is to receive a second signal from the radio base station; adapt the second signal by adapting a reference symbol sequence contained within the second signal to a changed symbol sequence, wherein the changed symbol sequence is specific to both the radio relay communication device and the radio base station.

7. The radio relay communication device according to claim 6, wherein the changed symbol sequence is generated based on the identification of the radio relay communication device.

8. The radio relay communication device according to claim 1, wherein the signal is a first signal in the changing circuit is to receive a second signal from the radio base station; adapt the second signal by applying a mask to resource elements contained within the second signal, wherein application of the mask to the resource elements removes symbols contained within the resource elements at locations specific to the radio relay communication device.

9. A method for relaying data comprising:
   receiving, by a radio relay communication device, a signal that includes data from a radio base station;
   adapting, by the radio relay communication device, the signal to enable identification of the radio relay communication device by the at least one mobile terminal, wherein adapting the signal includes applying a phase change to the signal, wherein: the phase change is specific to the radio relay communication device; applying the phase change to the signal includes phase shifting one or more subframes of a plurality of subframes contained within the signal; the phase shifting includes phase shifting 180°; and a phase of each subframe of the plurality of subframes indicates a digit of a numerical representation of an identity of the radio relay communication device; and
   sending the adapted signal to at least one mobile terminal.

10. The method of claim 9, wherein applying the phase change to the signal includes a phase shift of one or more symbols of a plurality of symbols contained within a subframe of the signal, and wherein the phase of each symbol indicates a digit of a numerical representation of an identity of the radio relay communication device.

11. The method of claim 9, wherein the signal is a first signal and the method further comprises:
   receiving a second signal from the radio base station; and
   adapting the second signal by adapting a reference symbol sequence contained within the second signal to a changed symbol sequence, wherein the changed symbol sequence is specific to both the radio relay communication device and the radio base station.

12. The method of claim 11, wherein adapting the reference symbol sequence includes generating the changed symbol sequence based on an identifier of the radio relay communication device and replacing the reference symbol sequence with the changed symbol sequence.

13. The method of claim 9 wherein the signal is a first signal and that the method further comprises:
   receiving a second signal from the radio base station; and
   adapting the second signal by applying a mask to resource elements contained within the second signal, wherein applying the mask to the resource elements removes symbols contained within the resource elements at locations specific to the radio relay communication device.

* * * * *